United States Patent
Breitfuss et al.

(10) Patent No.: US 7,941,176 B2
(45) Date of Patent: May 10, 2011

(54) CIRCUIT FOR PROCESSING AN OUTPUT SIGNAL OF A COMMUNICATION STAGE

(75) Inventors: Klemens Breitfuss, Voitsberg (AT); Heimo Bergler, St. Ruprecht (AT); Markus Harnisch, Graz (AT); Holger Kunkat, Neumuenster (DE)

(73) Assignee: NXP B.V., Eindhoven (NL)

( * ) Notice: Subject to any disclaimer, the term of this patent is extended or adjusted under 35 U.S.C. 154(b) by 868 days.

(21) Appl. No.: 11/579,053

(22) PCT Filed: Apr. 20, 2005

(86) PCT No.: PCT/IB2005/051288
§ 371 (c)(1),
(2), (4) Date: Oct. 23, 2007

(87) PCT Pub. No.: WO2005/106766
PCT Pub. Date: Nov. 10, 2005

(65) Prior Publication Data
US 2008/0090603 A1    Apr. 17, 2008

(30) Foreign Application Priority Data

Apr. 29, 2004 (EP) .................................. 04101839

(51) Int. Cl.
*H04M 1/00*    (2006.01)

(52) U.S. Cl. .............. 455/550.1; 455/551; 455/558
(58) Field of Classification Search .................. 455/551, 455/558
See application file for complete search history.

(56) References Cited

U.S. PATENT DOCUMENTS

| 5,130,816 A * | 7/1992 | Yoshio .......................... 386/99 |
| 6,356,769 B1 | 3/2002 | Vehmas et al. |

FOREIGN PATENT DOCUMENTS

WO    WO 03/079281    9/2003

* cited by examiner

*Primary Examiner* — David Q Nguyen

(57) ABSTRACT

In a circuit (2, 3) for processing at least one output signal (C1, C2, C3) of a communication stage, which at least one output signal (C1, C2, C3) of a communication stage can be generated by means of a communication stage, there are provided signal-mixing means (5), which signal-mixing means (5) are arranged to receive at least two output signals (C1, C2, C3) of communication stages and to mix the at least two output signals (C1, C2, C3) of communication stages and to transmit a collision signal representing the result of the mixing of the at least two output signals (C1, C2, C3) of communication stages, which collision signal represents a simultaneous occurrence of at least two output signals (C1, C2, C3) of communication stages in an electromagnetic field.

7 Claims, 4 Drawing Sheets

CIRCUIT FOR PROCESSING AN OUTPUT SIGNAL OF A COMMUNICATION STAGE

FIELD OF THE INVENTION

The invention relates to a circuit for processing at least one output signal of a communication stage, which at least one output signal of a communication stage can be generated by means of a communication stage.

The invention further relates to a data carrier having a circuit of the kind specified in the first paragraph.

The invention further relates to a communications device having a circuit of the kind specified in the first paragraph.

BACKGROUND OF THE INVENTION

A circuit of the above kind, a data carrier of the above kind and a communications device of the above kind are known from patent document WO 03/079281.

This document discloses a portable communications device, namely a mobile telephone, having a communication station configuration comprising a first communication stage for contactless communication with at least one data carrier external to the mobile telephone, and having a data carrier configuration comprising a second communication stage for contactless communication with at least one communications station that is also external to the mobile telephone. Provided in the mobile telephone is a detection circuit that is designed to detect the presence of an external data carrier or an external communication station in a communication zone of the communication station configuration incorporated in the mobile telephone and the data carrier configuration incorporated in the mobile telephone. Also provided is an activation circuit that cooperates with the detection circuit, the activation circuit being able, as a function of the result of the detection by the detection circuit, to activate the communication station configuration or data carrier configuration incorporated in the mobile telephone to communicate with their respective pendants. For communication to be established with the individual pendant—such as with a read/write station for example—the read/write station first emits a signal that represents an inventorizing command. This signal is processed by means of the circuits of the communication stages incorporated in the mobile telephone in such a way that the stages transmit their items of identifying information simultaneously, via their interfaces and their transmission means, to the read/write station. This will undoubtedly lead to what is termed a collision at a given bit position, and this collision will be recognized by the read/write station and dealt with by a so-called anti-collision procedure such as is defined in standard ISO 14443 for example. The collision occurs in this case at a physical level in the electromagnetic field between the read/write station and the communication station and becomes apparent in the form of at least one signal segment that is subject to a collision, which signal segment indicates the existence of two units of information that differ in respect of their information content and were transmitted to the read/write station simultaneously.

In the case of the known communications device, it has proved to be a disadvantage that both the communication station configuration incorporated in the mobile telephone and the data carrier configuration incorporated in the mobile telephone have to be provided with transmission means that are each arranged to transmit electromagnetic signals, and with interface means that are arranged to cooperate electronically with the transmission means, the interface means being arranged on the one hand to receive input information signals contained in the electromagnetic signals and on the other hand to transmit output information signals. It also has to be detected in the mobile telephone which of the two configurations needs to be activated, for which purpose, as mentioned, the detection circuit and the activation circuit are required. As a result, there are a very large number of components, some of which are redundant, and this increases the power consumption and size of the device.

OBJECT AND SUMMARY OF THE INVENTION

It is an object of the invention to overcome the disadvantages explained above that occur with a circuit of the kind specified in the first paragraph above, with a data carrier of the kind specified in the second paragraph above and with a communications device of the kind specified in the third paragraph above and to produce an improved circuit, an improved data carrier and an improved communications device.

To allow the above object to be achieved, features according to the invention are provided in a circuit according to the invention, thus enabling a circuit according to the invention to be characterized in the manner specified below, namely:

A circuit for processing at least one output signal of a communication stage, which at least one output signal of a communication stage can be generated by means of a communication stage, the circuit having signal-mixing means, which signal-mixing means are arranged to receive at least two output signals of communication stages and to mix the at least two output signals of communication stages and to emit a collision signal representing the result of the mixing of the at least two output signals of communication stages, which collision signal represents a simultaneous occurrence of at least two output signals of communication stages in an electromagnetic field.

To allow the above object to be achieved, a data carrier according to the invention can be characterized in the manner specified below, namely:

A data carrier having a circuit, wherein the data carrier is provided with a circuit according to the invention, wherein the circuit has interface means that are arranged for communication by contact and/or for contactless communication, wherein the circuit has a communication stage that is arranged to generate and emit an output signal of the communication stage, and wherein the signal-mixing means are arranged to cooperate with the communication stage and to cooperate with the interface means.

To allow the above object to be achieved, a communications device according to the invention can be characterized in the manner specified below, namely:

A communications device having a circuit, wherein the communications device is provided with at least one circuit according to the invention and/or with at least one data carrier according to the invention.

One of the things that is achieved in an advantageous manner by the provision of the features according to the invention is that a collision of output signals of communication stages that are generated in the course of contactless communication with a partner communications device, of the kind that occurs in the prior art outside the circuit, or outside the data carrier that has such a circuit, or outside a communications device that has such a circuit and/or such a data carrier, when communication-stage output signals that are able to be distinguished from one another are emitted simultaneously by different communication stages by electromagnetic means, can now be caused or simulated inside the circuit or data carrier or communications device and can be communicated to a partner communications device, such as a read/write station for example, by means of a single transmission means belonging to the communications device. Consequently, the superimposition and hence the collision of output signals of communication stages is no longer caused physically in the electromagnetic field but instead back within the circuit according to the invention, which also gives the advantage that an anti-collision procedure identical to the prior art, by means of which superimpositions or collisions of this kind can be dealt with by communications technology, can be used in the partner communications device and in the circuit, because the shift in the point at which the superimposition or collision takes place does not affect the steps in the conventional anti-collision procedure. What is also obtained in this way is the advantage that both the redundant components that are provided in the prior art for transmitting the output signals from the communication stages, and the detection circuit and the activation circuit can be dispensed with, as a result of which it becomes possible for the invention to be implemented relatively easily in terms of hardware and to be implemented very easily by software means.

In a circuit according to the invention, it has also proved advantageous if, in addition, the provisions claimed in claim 2 are made. This gives the advantage that the mixing, i.e. the simulation within the circuit of the superimposition or collision of output signals of communication stages that, in the prior art, occurs in the electromagnetic field, can be performed in the simplest possible way, to give signal segments that are superimposed or subject to collision, which superimposed or colliding signal segments represent the existence of units of information having different information contents or the existence of more than a single communication-stage output signal, or to give signal segments that are free of superimpositions or collisions, which superimposition free or collision-free signal segments represent the existence of identical information contents or the existence of a single communication-stage output signal. It has proved particularly advantageous in this connection if the units of information are logic OR-gated. It should however be mentioned at this point that, as a function of the logic selected, i.e. as a function of whether it is positive or negative logic that is used to represent the states of the units of information, provision may be made for the units of information to be logic gated in other ways, such for example as for them to be AND-gated.

In a circuit according to the invention, it has also proved advantageous if, in addition, the provisions claimed in claim 3 are made. This gives the advantage that the mixing of the units of information can be performed relatively easily and in the partner communications device the recognition of superimposed or colliding signal segments, i.e. ones that indicate a collision, can take place without any change to the anti-collision procedure usual in the prior art.

In a circuit according to the invention, it has also proved advantageous if, in addition, the provisions claimed in claim 4 are made. This gives the advantage that, where required within a communications device in which the circuit is provided and in which a plurality of communication stages are provided that are able to communicate via a common interface with a partner communications device outside the communications device, no conflicts can occur over the use of the interface as soon as one of the communication stages has been activated.

It should be explicitly made clear at this point that the advantages itemized in connection with the circuit according to the invention also exist in the case of a data carrier according to the invention and in the case of a communications device according to the invention.

In a communications device according to the invention, it has also proved advantageous if the additional features claimed in claims 7 and 8 respectively are provided. The provision of these features gives the advantage that so-called consumer electronics devices may also be endowed with a feature that is implemented by the circuit according to the invention or a data carrier according to the invention. It should also be mentioned at this point that what can also be covered are communication-stage output signals that originate from a plurality of communication stages contained within the communications device, by which means it becomes possible to implement modular expandability for the feature or features that is or are defined by the communication stages. In this connection, it has also proved to be advantageous that both communication stage output signals originating from outside the communications device and communication stage output signals originating from inside the communications device can be superimposed on one another. What this makes possible is for example the cascading of communication stages by means of contacts.

These and other aspects of the invention are apparent from and will be elucidated with reference to the embodiments described hereinafter, to which the invention is not limited however.

DESCRIPTION OF EMBODIMENTS

Figure 1:
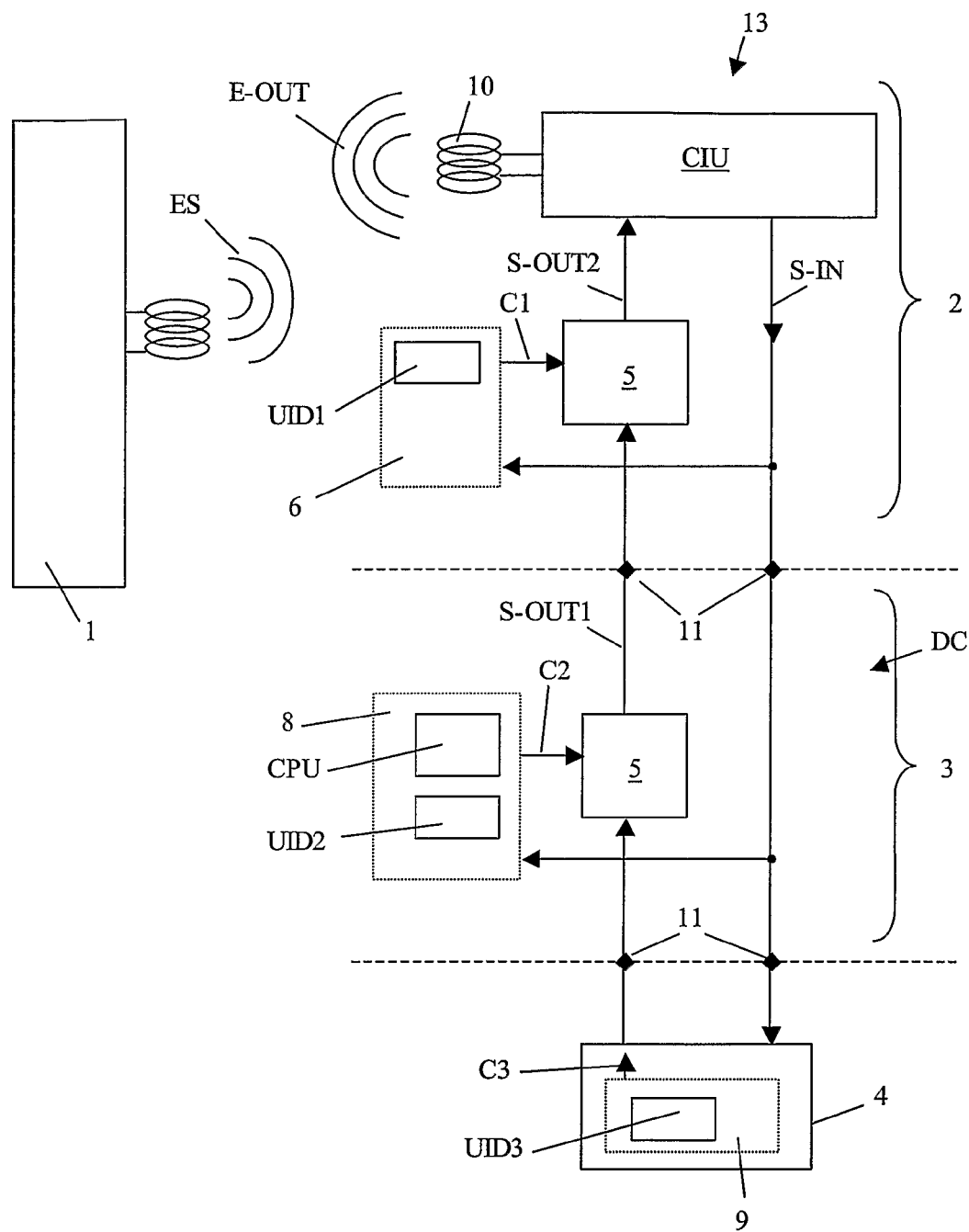
FIG. 1 is a block circuit diagram showing, in schematic form, a communications device according to the invention having a circuit according to the invention contained in it and having a data carrier according to the invention, which likewise contains the circuit according to the invention, used in it.

FIG. 1 shows a communications device 13 according to the invention having a circuit according to the invention, a data carrier DC according to the invention that has been inserted in the communications device 13, and a conventional data carrier 4 that has likewise been inserted in the communications device 13.

In the communications device 13, the circuit according to the invention is implemented in the form of a communication-device circuit 2 that comprises a first communication stage 6, interface means CIU, transmission means 10 connected to the interface means CIU, and first signal-mixing means 5, which signal-mixing means 5 will be looked at in detail below.

By means of the transmission means 10 and the interface means CIU, the communications device 13 is arranged for contactless communication under standard ISO 14443. In this case, the communications device 13 behaves, with the help of its transmission means 10 and with the help of the interface means CIU, like a data carrier defined in standard ISO 14443 in relation to a read/write station 1, which is also shown in FIG. 1 and which operates in compliance with standard ISO 14443, which read/write station 1 performs the function of a so-called reader.

The communications device 13 is further arranged to receive a data carrier DC according to the invention and a conventional data carrier 4. For this purpose, the communications-device circuit 2 is arranged for electronic cooperation by contacts with the data carrier DC according to the invention that can be inserted in the communications device 13, which data carrier DC has a circuit according to the invention implemented in the form of a data-carrier circuit 3. By means of the data carrier DC according to the invention, it also becomes possible for the communications-device circuit 2 to cooperate in cascade, beyond the data-carrier circuit 3, with the conventional data carrier 4.

The first communication stage 6 is incorporated in the communications-device circuit 2 and has storage means for storing a unique first item of identifying information UID1. The first communication stage 6 is arranged to receive an inventorizing command that can be generated by means of the read/write station 1 and emitted thereby, which inventorizing command is represented by an input signal S-IN, and, on receipt of the inventorizing command, to transmit the first item of identifying information UID1, in the form of a first communication stage output signal C1, to the first signal-mixing means 5.

In the present case, the data carrier DC is shown inserted in the communications device 13. The data carrier DC has—as mentioned above—a data-carrier circuit 3 according to the invention in which data-carrier circuit 3 are included second signal mixing means 5. The data carrier DC is implemented in the form of what is known as a dual interface data carrier and has two interface means (not specifically shown in FIG. 1) that are arranged for communication by contact. With the help of a first one of these interface means, the data carrier DC is connected electrically, via contact arrays 11, to the communications-device circuit 2 for communication by contact. With the help of a second one of these interface means, the data carrier DC is connected electrically, via contact arrays 11', to the conventional data carrier 4 for communication by contact.

Included in the data-carrier circuit 3 is a second communication stage 8 that, similarly to the first communication stage 6, has storage means for storing a unique second item of identifying information UID2. The second communication stage 8 is arranged to receive the inventorizing command via the interface of the data carrier DC that cooperates with the communications-device circuit 2 and, on receipt of the inventorizing command, to transmit the second item of identifying information UID2, in the form of a second communication-stage output signal C2, to the second signal-mixing means 5.

Included in the circuit (not specifically shown) of the conventional data carrier 4 is a third communication stage 9 that, also similarly to the first communication stage 6, has storage means for storing a unique third item of identifying information UID3. The third communication stage 9 is arranged, in a conventional contact-employing manner, to receive the inventorizing command beyond the data carrier DC according to the invention and, on receipt of the inventorizing command, to transmit the third item of identifying information UID3, in the form of a third communication-stage output signal C3, directly to the data carrier according to the invention, where it is passed on in the data-carrier circuit 3 to the second signal-mixing means 5.

The inventorizing command is defined in standard ISO 14443 and can be received from the read/write station 1 by means of the transmission means 10 and the interface means CIU and can be transmitted as discussed above to the three communication stages 6, 8 and 9. The communication-stage output signals C1, C2 and C3 that are output by the three communication stages 6, 8 and 9 represent units of information, which in the present case are bits of the items of identifying information UID1, UID2 and UID3, which bits are coded in the Manchester code.

Figure 2:
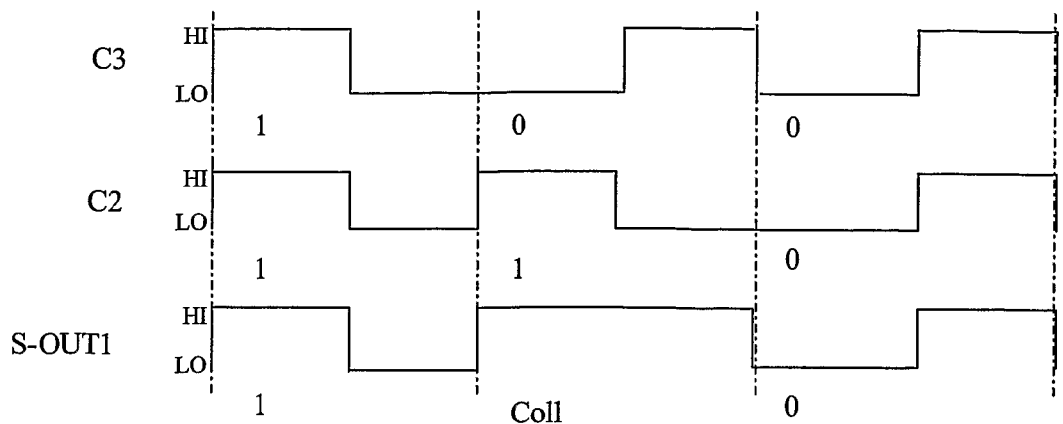
FIG. 2 is a signal diagram showing two output signals of communication stages that are fed to a circuit according to the invention, and a resulting signal that is obtained by means of the circuit according to the invention by mixing the two output signals of the communication stages.

The second signal-mixing means 5 are arranged to mix the communication stage output signals C3 and C2 received, i.e. to superimpose them on one another bit by bit, as shown in the signal diagram in FIG. 2. The signal waveforms in the signal diagram show three bits of items of identifying information UID3 and UID2 respectively, which bits are coded in the Manchester code. The Manchester code requires that a change of level take place every half bit-length, or in other words, if the bit concerned is a logic 1 that a change take place from a high level HI to a low level LO, and if the bit concerned is a logic 0, that a change take place from a low level LO to a high level HI. In this way the communication stage output signal C3 has the bit sequence 1-0-0 and the communication stage output signal C2 has the bit sequence 1-1-0. These two signals C3 and C2 are then superimposed on one another, or mixed with one another, by logic OR-gating in accordance with the truth table given below, as a result of which a first signal-mixing-means output signal S-OUT1 is obtained at the output of the second signal-mixing means 5

| C3 | C2 | S-OUT1 |
|----|----|--------|
| LO | LO | LO |
| LO | HI | HI |
| HI | LO | HI |
| HI | HI | HI |

HI = high level = active level
LO = low level = quiescent level

It can be seen from FIG. 2 that the first bit of the resulting first signal-mixing-means output signal S-OUT1 is a logic one and the third bit is a logic zero, which correspond to the bit values in the communication-stage output signals C3 and C2, whereas there is a data collision Col1 at the third bit because the values of the communication-stage output signals C3 and C2 are different at this bit position and the signal waveform resulting from the OR-gating is at the high level HI throughout the bit, which constitutes what is termed a code violation in the case of the Manchester code.

Figure 3:
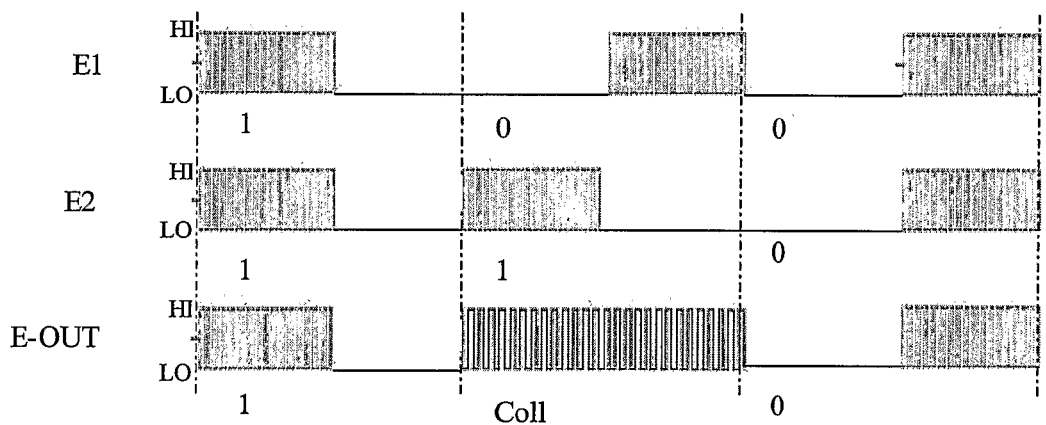
FIG. 3 is a signal waveform diagram showing various states of modulation of a carrier signal that occur in an electromagnetic field, which states of modulation represent superimposed or colliding signal segments and also superimposition free or collision-free signal segments, both of which can be generated by means of the circuit according to the invention.

The signal-mixing means 5 are therefore arranged to emit a collision signal representing the result of the mixing, which collision signal represents a simultaneous occurrence in an electrical field of two communication-stage output signals C3 and C2 that differ in respect of the information they contain in one unit of information. To show what this actually means, attention will be directed at this point to FIG. 3. In the first signal waveform E1 is shown schematically the load modulation of a carrier signal by the communication stage output signal C3 alone. In the second signal waveform is shown schematically the load modulation of the carrier signal by the communication-stage output signal C2 alone. In the third signal waveform is shown, at a signal segment Col1, a mixture of the modulations of the carrier signal that are caused by the two communication-stage output signals C3 and C2, such as would be caused by the signal segment Col1 shown in FIG. 2 if the signal waveform shown at that point in the first signal-mixing-means output signal S-OUT1 were used to load-modulate the carrier signal.

The first signal-mixing-means output signal S-OUT1 can be passed on by means of the first interface means of the data carrier DC to the communications-device circuit 2 and can be fed there to the first signal-mixing means 5. In the first signal-mixing means 5, the first communication-stage output signal C1 is mixed, bit-by-bit likewise, with the first signal-mixing-means output signal S-OUT1 that represents the communication-stage output signals C2 and C3 that have already been mixed previously, as a result of which a second signal-mixing-means output signal S-OUT2 is obtained, which is transmitted to the interface means CIU. Because each of the communication-stage output signals C1, C2 and C3 is individual, the second signal-mixing-means output signal S-OUT2 has at least two signal segments Col1 in the present case, although this has not been specifically shown in graphic form.

With regard to the progress through time of the mixing of the three communication-stage output signals C1, C2 and C3, it should be mentioned at this point that bits of the two communication-stage output signals C3 and C2 that correspond to one another are mixed with one another at the second mixing means 5 and the mixed signal represented by the first signal-mixing-means output signal S-OUT1 is transmitted without delay to the first signal-mixing means 5 and the bit of the first communication-stage output signal C1 that corresponds in respect of its bit position is mixed in. Because of this quasi-simultaneous bit-by-bit mixing of those bits of the three communication stage output signals C1 to C3 that correspond to one another in respect of their bit positions, standard-compliant timing is obtained when the communication-stage output signals C1 to C3 are emitted. It should however be mentioned at this point that in another case simultaneous mixing of all the mutually corresponding bits in the two communication-stage output signals C3 and C2 may take place, after which all the bits in the first communication-stage output signal C1 are finally mixed in in a further mixing process. In this case the timing of the emission may be determined by the interface means CIU, to which interface means CIU the individual bits are not fed serially as implied above and instead the entire number of bits are all fed at once.

It should be mentioned that in a further embodiment of the signal-mixing means 5, inverted logic may be preferred, the quiescent level of the input and output signals to and from the signal-mixing means 5 may be the high level HI and the active level, which results in loading of the electromagnetic carrier signal by load modulation, may be the low level LO. Accordingly, the OR truth table given above changes, if the logic is inverted, to the AND truth table given below

| IN1 | IN2 | OUT |
| --- | --- | --- |
| LO | LO | LO |
| LO | HI | LO |
| HI | LO | LO |
| HI | HI | HI |

LO = low level = active level
HI = high level = quiescent level

The result is the same with both positive logic and inverted logic, namely that just the presence of a single active level in an input signal to the signal-mixing means 5 results in the particular signal-mixing-means output signal S-OUT1 or S-OUT2 likewise going to an active level.

By the making of the provisions according to the invention the advantage is obtained that the collision at a bit position in the response to the inventorizing command that is transmitted by means of the transmission means 10 is detected at a conventional read/write station 1, even though this collision did not occur in the electromagnetic field between the read/write station 1 and the communications device 13 and instead was produced by means of the first or second signal-mixing means 5, and the read/write station 1 is then able to work through a conventional anti-collision protocol of the kind for which provision is made in standard ISO 14443.

The same is true in cases where the data carrier DC or the read/write station 1 or both are in the form of so-called near-field communication devices (NFC devices) conforming to standard ISO 18092.

In cases where there are a plurality of communication stages 6, 8 and 9 present in a communications device 13, as is shown in FIG. 1, and the plurality of communication stages 6, 8 and 9, once they have been activated to communicate or, as in the case of an NFC device, have started communicating in their active mode on their own initiative, are intended to use a single interface CIU or a single transmission means 10 for communicating, it has proved to be an advantage if, in addition to the signal-mixing means 5, there are also priority-ensuring means provided that are arranged to ensure the priority of the communication stage that is active in respect of communication over the non-active communication stages. It should be mentioned at this point that it is also possible for a plurality of communication stages to be selected so that they can take part in the communication in their passive communications mode.

The communications device that is active in respect of communication in this case is the one that was either selected to communicate by selection as part of an anti-collision procedure, in the way that is usual for data carriers or their circuits conforming to standard ISO 14444 or for NFC devices, either of which are being operated in their passive communications mode. This is also of importance in the case of an NFC device that has became active as part of a so-called collision avoidance procedure under ISO 18092.

The priority-ensuring means may for example cooperate with the individual communication stages 6, 8 and 9 and monitor the activities or states of the latter and, as soon as a state that is active in respect of communication is detected at one of the communication stages, may act on the states of the other communication stages to the effect that these remain in their state that is inactive in respect of communication, i.e. do not make any unwanted use of the shared transmission means 10 or the shared interface CIU. In a particularly practical implementation, the priority-ensuring means are produced by means of software.

Figure 4:
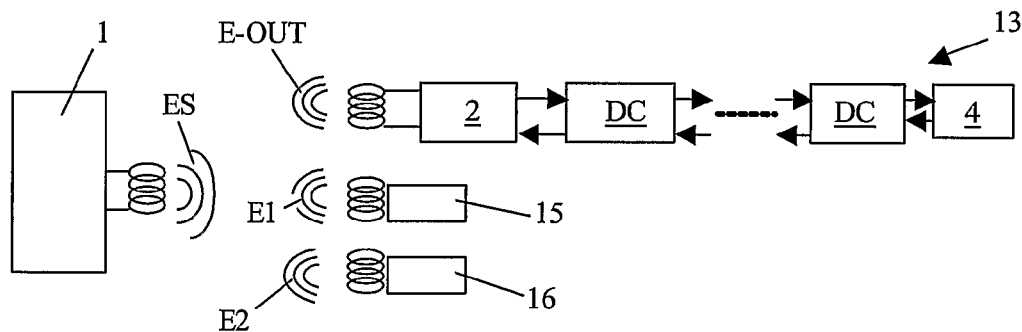
FIG. 4 shows, in a similar way to FIG. 1, an arrangement comprising a read/write means for contactless data carriers, two conventional contactless data carriers and a communications device according to the invention having data carriers cascaded by means of contacts.

In FIG. 4, the conventional read/write station 1 is shown opposite two conventional contactless data carriers 15, 16 and the communications device 13 according to the invention, the communications device 13 having a communications-device circuit 2 according to the invention, cascaded data carriers DC according to the invention each with a data-carrier circuit 3 according to the invention, and a conventional data carrier 4. It should be mentioned that in theory any desired number of data carriers DC can be cascaded together. It should be mentioned that the data carriers DC and 4 may each be configured to have CPUs of their own and thus to have a certain intelligence of their own. In a configuration of this kind, applications with secure data storage are also possible.

If the read/write station 1 transmits an inventorizing command that can be transmitted by means of the electromagnetic signal ES, the conventional contactless data carriers 15, 16 and the communication stages contained in the communications device 13, which are not explicitly shown, respond by announcing their specific items of identifying information.

When this is done, collisions may occur at different bit positions in the items of identifying information communicated to the read/write station 1, it being immaterial whether these collisions are produced in the electromagnetic field by the communications device 13 and the data carriers 14 and 15 or in the communications device 13 by means of the signal-mixing means 5 contained in the communications-device circuit 2 or the data-carrier circuit 3.

In all cases, the read-write station 1 is able to perform a conventional ant-collision procedure in order to determine the items of identifying information of all the data carriers DC or 4 situated in its communications zone, or to be more exact of all the communication stages that are present, and in this way to select, separately, the data carriers 15, 16, the communications-device circuit 2, one of the cascaded data carriers DC according to the invention, or the cascaded conventional data carrier 4, and thus to address them selectively.

It should be mentioned that the communication stages of the circuits 2 and 3 according to the invention may, as well as having the functionality of the signal-mixing means, also perform the function of known data carriers, such as that of a smart card, conforming to for example standard ISO 14443 or that of a dual interface card, such for example as one conforming to the de facto MIFARE® standard, or that of an SIM (subscriber identity module) for mobile telephones, or combined functions.

It should also be mentioned that the communication stages of the circuits 2 and 3 according to the invention may perform the function of NFC devices, conforming to standard ISO 18092 for example.

Figure 5:
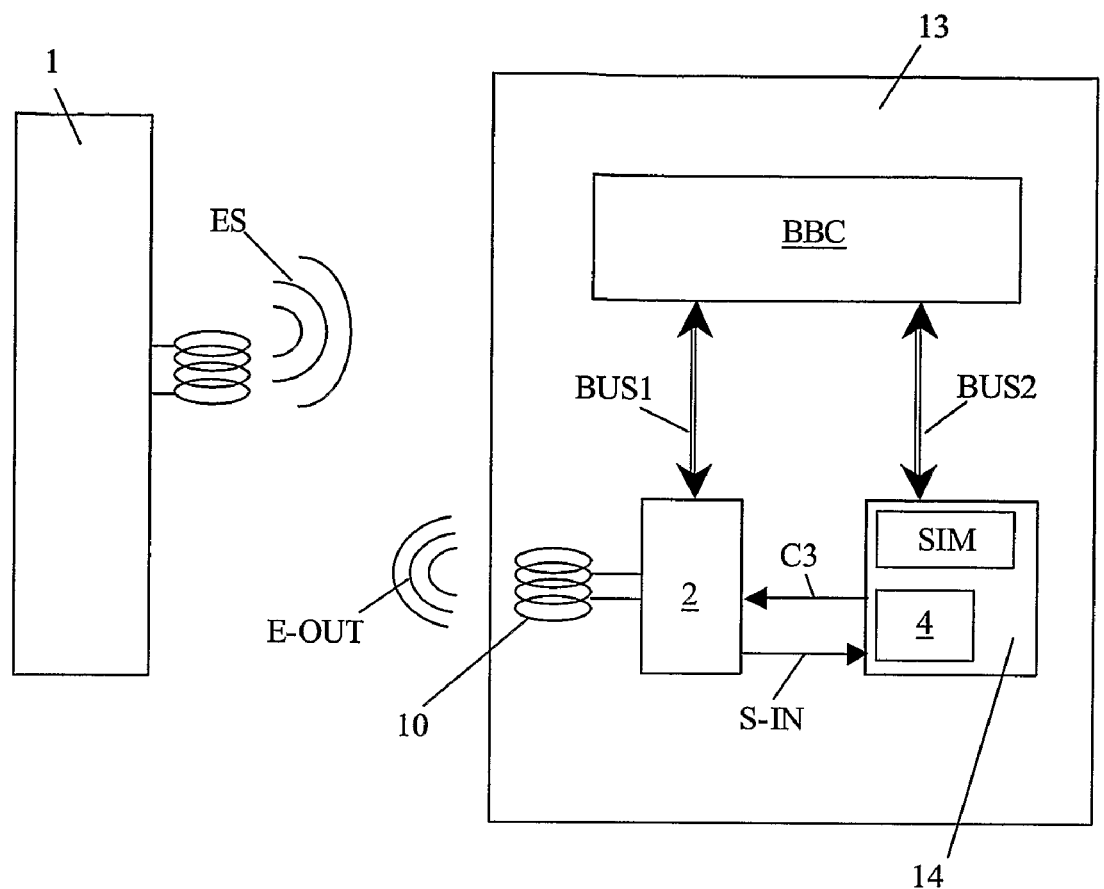
FIG. 5 shows, in a similar way to FIG. 1, a communications device having a circuit according to the invention and a data carrier according to the invention.

FIG. 5 shows a communications device 13 in the form of a mobile telephone having, incorporated in the mobile telephone, a communications-device circuit 2 according to the invention that is able to receive, via the transmission means 10, electromagnetic signals ES from the read-write station 1 external to the mobile telephone and is itself able to transmit electromagnetic signals E-OUT to the read/write station 1. The circuit 2 is cascaded, in the manner according to the invention, by contacts with a conventional data carrier 4 that is able to be removed from the mobile telephone. The circuit 2 is of the type that was described by reference to FIG. 1, which means that the input information signals S-IN extracted from the received electromagnetic signals ES are looped through to the data carrier 4, and communication-stage output signals C3 generated by the data carrier 4 are mixed, in signal mixing means 5 (not explicitly shown) belonging to the communications-device circuit 2, with the communication-stage output signals of a communication stage (not explicitly shown likewise) that is incorporated in the circuit 2. The data carrier 4 has a common substrate 14 for, firstly, a subscriber identity module (SIM) that is required for the operation of the mobile telephone and is connected via a data-bus BUS2 that operates to standard ISO 7816 to a baseband controller BBC that controls essential functions of the mobile telephone and, secondly, a secure application module (SAM) by which secure applications are implemented. For extended application capabilities, the baseband controller BBC is also connected in this case to the circuit 2 according to the invention, via a serial data-bus BUS. The communications device 13 according to the invention can be used for a large number of applications. Examples of applications of this kind that may be mentioned are the on line booking of tickets, or the loading of the communications device 13, via an external read/write station, with authorizing information that can be read by access systems, as a result of which the communications device can act as an electronic "key". The implementation of electronic purses or a credit card is possible in a similar way.

Figure 6:
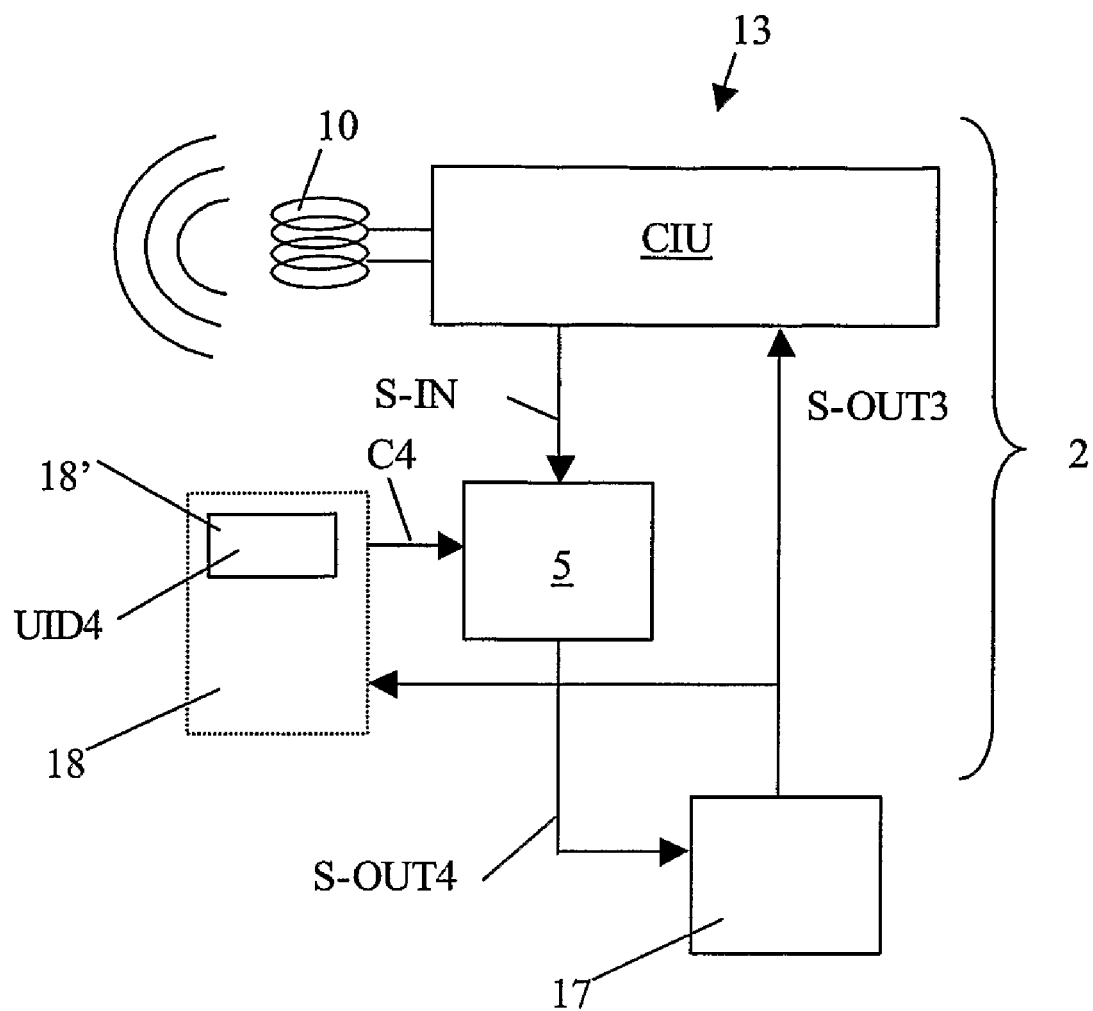
FIG. 6 shows, in a similar way to FIG. 1, a communications device having a circuit according to the invention for mixing output signals of communication stages at the reception end.

Unlike the communications device 13 shown in FIG. 1, which is arranged to mix communication stage output signals C1 to C3 at the transmission end, the communications device 13 shown in FIG. 6 is arranged to mix communication-stage output signals C1 to C4 at the reception end.

The communications device 13 shown in FIG. 6 acts as a read/write station according to the invention that is arranged for contactless communication under standard ISO 14443 and, in a similar way to the communications device 13 shown in FIG. 1, it has the communications-device circuit 2 according to the invention, the signal-mixing means 5 being provided in the present case downstream of the interface means CIU in a reception branch. In the present case the signal-mixing means 5 are suitable for receiving the input signal S-IN emitted by the interface means CIU, which signal S-IN represents, in the present case, a response from a partner communications device that is communicating with the communications device 13. A partner communications device of this kind is formed in the present case by the communications device 13 shown in FIG. 1, which communicates communication-stage output signals C1 to C3 that have already been premixed, in the form of the second signal-mixing-means output signal S-OUT2, to the communications device 13 shown in FIG. 6. It should however be mentioned that each of the conventional data carriers 15 and 16 shown in FIG. 4 may equally well form the partner communications device, the items of identifying information from these data carriers being mixed in the electromagnetic field.

For the purpose of calling up the items of identifying information UID1 to UID3 stored in the partner communications device, there is provided in the communications device 13 a fourth communication stage 17 that is arranged to generate the inventorizing command and to transmit the inventorizing command in the form of third communication-stage output signals S-OUT3 to the interface means CIU, by means of which the signals are communicated to the partner communications device.

Coupled to the signal-mixing means 5 by contacts is a conventional data carrier 18 that provides the function of what is termed a secure application module (SAM) and that has a fourth communication stage 18', which latter can be uniquely identified by a fourth item of identifying information UID4 that is stored in it. The data carrier 18 is coupled to the communication stage 17 in such a way that the third communication stage output signal S-OUT3 can be fed to it by contact means, by means of which signal it too can be requested to transmit its item of identifying information UID4 to the signal-mixing means 5, where the fourth item of identifying information UID4 is mixed either with a single other communication stage output signal C1, C2 or C3 that has been received via the electromagnetic field, or with already premixed communication stage output signals C1, C2 and C3 that have been received via the electromagnetic field.

At the output end, the signal-mixing means 5 are connected to the fourth communication stage 17 and they are arranged to emit a signal-mixing-means output signal S-OUT4 that represents the mixing of at least two of the communication-stage output signals C1, C2, C3 and C4. In the event of there not being an external communication stage in the communication zone of the communications device 13, it is however merely the item of identifying information UID4 that is used to form the signal-mixing-means output signal S-OUT4, which latter is then transmitted to the communication stage 17.

As soon as the communication stage 17 detects a collision at a bit position in the signal-mixing-means output signal S-OUT4, it starts an anti-collision procedure under standard ISO 14443, in which the commands and parameters that the communication stage 17 is able to emit in this case are communicated with the help of the communication-stage output signal S-OUT3 both to the external communication stages and to the internal communication stage of the data carrier 18.

By the making of the provisions according to the invention, there is obtained in the present case the advantage that what can be selected by an anti-collision procedure are not only communication stages arranged externally of the communications device 13 but also the communication stage of an internal data carrier 18, as shown in FIG. 6, or the communication stages of a plurality of internal data carriers, although this is not shown in detail in FIG. 6. This plurality of internal data carriers may for example be connected in cascade in a way similar to that shown in FIG. 1. It should also be mentioned that the plurality of data carriers may also be connected, in parallel, to individual inputs that are assigned to them of the signal-mixing means 5, a provision that may of course also be made in the communications device 13 shown in FIG. 1.

It should be mentioned at this point that what may also be understood by the term mixing is a change in the modulation index.

It should also be mentioned that in FIG. 1 the input signal may also be fed to the interface means CIU from within the communications device or from outside the communications device, as desired. Something else that should be mentioned is that the second signal-mixing-means output signal S-OUT2 may also be made available for internal processing within the communications device 13.

The invention claimed is:

1. A circuit for processing at least one output signal characterized by signal-mixing means arranged to receive at least two output signals of communication stages, wherein the signal-mixing means are arranged to logic gate the at least two output signals of communication stages that are received in respect of the units of information that are respectively represented by them and that correspond to one another,
   to mix the at least two output signals by superimposing them, and to emit a collision signal representing the result of the mixing of the at least two output signals, wherein the collision signal is a superimposition of the at least two output signals representing a simultaneous occurrence of the at least two output signals in an electromagnetic field.

2. A circuit as claimed in claim 1, wherein the signal-mixing means are arranged to process an output signal of a communication stage that is coded in the Manchester code.

3. A circuit for processing at least one output signal characterized by signal-mixing means arranged to receive at least two output signals of communication stages, to mix the at least two output signals by superimposing them, and to emit a collision signal representing the result of the mixing of the at least two output signals, wherein the collision signal is a superimposition of the at least two output signals representing a simultaneous occurrence of the at least two output signals in an electromagnetic field wherein the circuit has priority-ensuring means that, once at least one of the communication stages has been activated to communicate, are arranged to ensure that this at least one selected communication stage retains its priority with respect to communication over another communication stage that has not been selected.

4. A data carrier having a circuit, the circuit for processing at least one output signal, wherein the circuit has interface means that are arranged for communication by contact and/or for contactless communication, wherein the circuit has a communication stage that is arranged to generate and emit an output signal of the communication stage, the circuit characterized by signal-mixing means arranged to receive at least two output signals of communication stages, wherein the signal-mixing means are arranged to cooperate with the communication stage and to cooperate with the interface means, the signal-mixing means to mix the at least two output signals by superimposing them, and to emit a collision signal representing the result of the mixing of the at least two output signals, wherein the collision signal is a superimposition of the at least two output signals representing a simultaneous occurrence of the at least two output signals in an electromagnetic field.

5. A communications device having a circuit, wherein the communications device is provided with at least one circuit with at least one data carrier as claimed in claim 4.

6. A communications device as claimed in claim 5, wherein the communications device is in the form of a mobile telephone or a personal digital assistant.

7. A communications device as claimed in claim 5, wherein the communications device is in the form of a read/write station for data carriers.

\* \* \* \* \*